US011178038B1

(12) United States Patent
Silva Moran et al.

(10) Patent No.: US 11,178,038 B1
(45) Date of Patent: Nov. 16, 2021

(54) INTERNET OF THINGS DEVICE ORCHESTRATION

(71) Applicant: INTERNATIONAL BUSINESS MACHINES CORPORATION, Armonk, NY (US)

(72) Inventors: Dario Andres Silva Moran, Buenos Aires (AR); Yara Rizk, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/093,682

(22) Filed: Nov. 10, 2020

(51) Int. Cl.
G06F 15/16 (2006.01)
H04L 29/12 (2006.01)
H04L 29/06 (2006.01)
H04L 29/08 (2006.01)
H04L 12/26 (2006.01)
H04L 12/24 (2006.01)

(52) U.S. Cl.
CPC ............ *H04L 43/10* (2013.01); *H04L 41/046* (2013.01); *H04L 67/10* (2013.01)

(58) Field of Classification Search
CPC ....... H04L 43/10; H04L 41/046; H04L 67/10; H04L 67/20
USPC ......................................................... 709/202
See application file for complete search history.

(56) References Cited

U.S. PATENT DOCUMENTS 7,610,559 B1 * 10/2009 Humpleman ........... H04L 67/16
715/762
8,726,343 B1  5/2014 Borzycki 2013/0212212 A1 * 8/2013 Addepalli ............... G06F 9/461
709/217
2017/0006116 A1  1/2017 Kelly
2018/0091621 A1 * 3/2018 Kuo .................... H04L 67/2823
2018/0184232 A1  6/2018 Maitra
(Continued)

FOREIGN PATENT DOCUMENTS

KR         102056894 B1    12/2019

OTHER PUBLICATIONS

Carnevale et al., "From the Cloud to Edge and IoT: A Smart Ochestration Architecture for Enabling Osmotic Computing", 2018 32nd International Conference on Advanced Information Networking and Applications Workshops, pp. 419-424.
(Continued)

Primary Examiner — Ruolei Zong
(74) Attorney, Agent, or Firm — John Noh

(57) ABSTRACT

A method, a computer program product, and a computer system orchestrate devices of a device ecosystem. The method performed by an orchestrator includes receiving polling data from agents that are directly connected to the devices indicating simulations run by the devices for a cloud service. The method comprises determining a preview state of the device ecosystem. The method comprises determining an action to change a state of the device ecosystem based on the preview state. The method comprises generating an instruction for the action and the devices to perform the action. The method comprises transmitting the instruction to the agents, the agents actuating the change via the determined at least one of the devices performing the action. The orchestrator orchestrates the agents such that the devices are provided the cloud service isolated from a cloud computing system associated with the cloud service.

20 Claims, 7 Drawing Sheets

(56) References Cited

U.S. PATENT DOCUMENTS

| | | | | |
|---|---|---|---|---|
| 2018/0262394 A1* | 9/2018 | Sakura | .................... | H04W 4/50 |
| 2019/0109891 A1* | 4/2019 | Paruchuri | ............... | H04L 29/06 |
| 2019/0149599 A1 | 5/2019 | Bartfai-Walcott | | |
| 2019/0245806 A1 | 8/2019 | Hanes | | |
| 2021/0012445 A1* | 1/2021 | Bartfai-Walcott | ...... | H04L 9/321 |
| 2021/0014132 A1* | 1/2021 | Smith | .................. | H04L 9/3239 |

OTHER PUBLICATIONS

Mell et al., "The NIST Definition of Cloud Computing", National Institute of Standards and Technology, Special Publication 800-145, Sep. 2011, pp. 1-7.

Wen et al., "Fog Orchestration for Internet of Things Services", http://act.buaa.edu.cn/yangrenyu/paper/ic2017.pdf, Source: IEEE Internet computing: vol. 21, Issue 2, Publisher: IEEE, Mar. 1, 2017, pp. 16-24.

Wen et al., "Fog Orchestration for IoT Services: Issues, Challenges and Directions", IEEE Internet Computing, Nov. 2016, pp. 1-10.

* cited by examiner

INTERNET OF THINGS DEVICE ORCHESTRATION

BACKGROUND

The exemplary embodiments relate generally to cloud and fog computing, and more particularly to device orchestration performed as an intermediary operation without requiring cloud processing.

In a network, a fog that utilizes fog computing or fog networking may provide an architecture that is positioned between a cloud and edge devices. The fog may be configured to perform a substantial amount of computation, storage, data and/or signal exchange, as well as other cloud and/or fog operations in a local manner which is subsequently routed over a network backbone. Although the fog may provide certain features, there may be instances where the cloud is required to perform operations, particularly cloud service operations.

For example, there may be a set of devices that share a common network in a fog but are functionally unrelated to each other. In such a scenario, an action or data in a device may not produce an effect on any other device. The combination of data from different devices may only be interpreted in the cloud through the cloud performing cloud service operations where logical aggregations may be defined and transformations applied. Accordingly, intelligence and automatic task triggering in the fog may be missed.

In another example, there may be a user utilizing a device who is associated with a cloud. The user may wish to access device information from another device on the cloud. Being associated with the cloud, the user and the device being utilized may have access to the requested information using the cloud services in the cloud. However, the cloud, the area in which the user is located, etc. may not be configured with a fog. Accordingly, pushing information towards the fog to utilize the features of the fog may not be readily available for use. In such a scenario, the user is required to rely on the fog and all communications entailed with such a data exchange, even when an increased latency and other drawbacks must be handled.

SUMMARY

The exemplary embodiments disclose a method, a computer program product, and a computer system for orchestrating devices of a device ecosystem. The method comprises receiving, by an orchestrator, polling data from agents, each of the agents being directly connected to one or more of the devices. The polling data is indicative of a respective simulation run by each of the devices observing the device ecosystem for a cloud service utilized by the devices. The method comprises determining, by the orchestrator, a preview state of the device ecosystem based on the polling data. The method comprises determining, by the orchestrator, an action to be performed by at least one of the devices to actuate a change to a state of the device ecosystem based on the preview state of the device ecosystem. The method comprises generating, by the orchestrator, an instruction indicative of the action and the at least one of the devices to perform the action. The method comprises transmitting, by the orchestrator, the instruction to the agents, the agents actuating the change via the determined at least one of the devices performing the action. The orchestrator orchestrates the agents such that the devices are provided the cloud service isolated from a cloud computing system associated with the cloud service.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
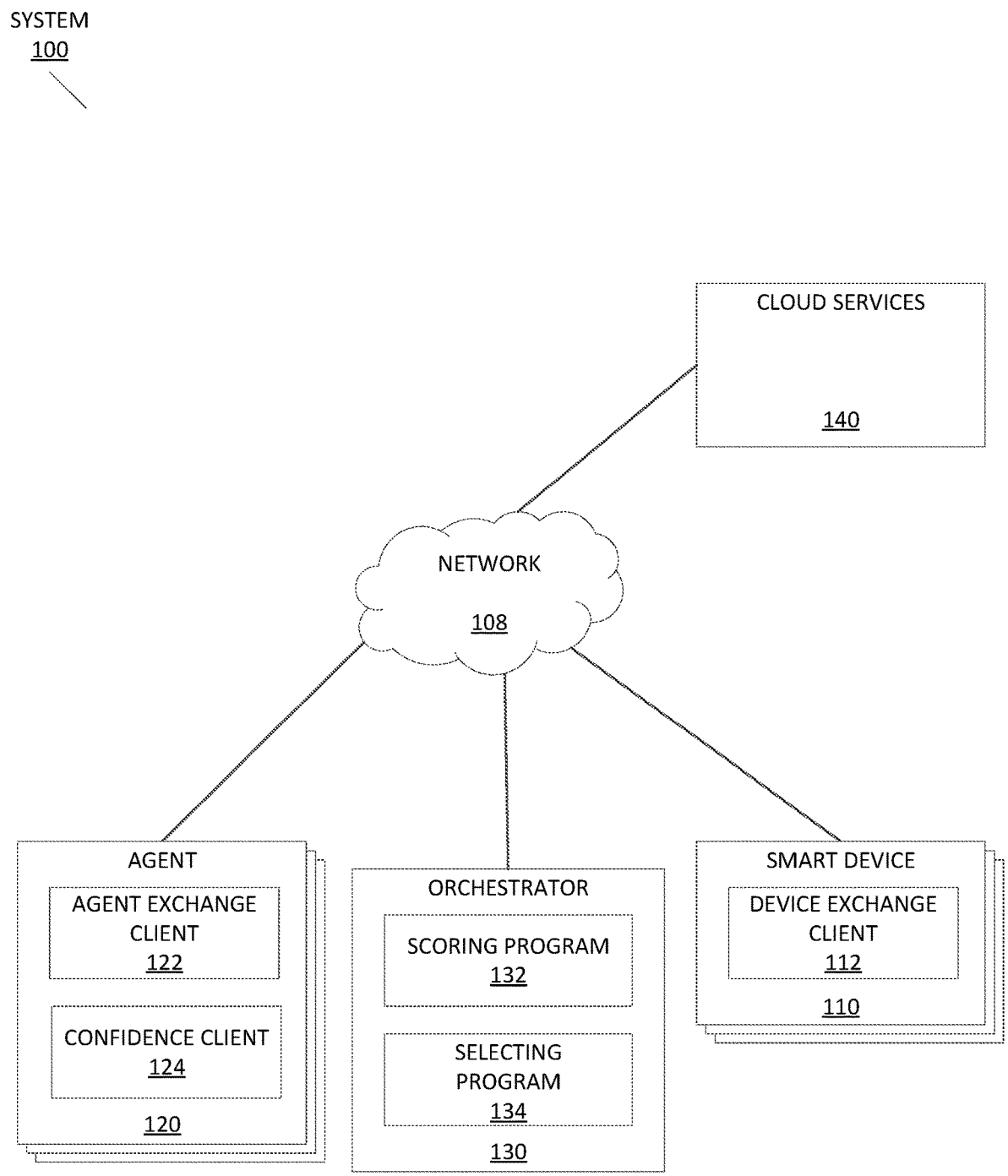
FIG. 1 depicts an exemplary schematic diagram of a device orchestration system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for orchestrating devices using data polled from the devices through directly connected agents. As will be described in further detail below, each agent may establish a direct communication path with a plurality of devices such that data is transmitted from the device to the agent without an intermediate component, excluding conventional network connection components. The exemplary embodiments provide an orchestrator that polls the devices and receives the data from the agents to determine whether an action to change a state of a world of the devices is to be performed such that a cloud service is at least partially provided via the change to the state of the world with regard to the devices without requiring a cloud infrastructure or the cloud performing operations for the cloud service. In the exemplary embodiments, the orchestrator is positioned in an architecture that exists between the agents and the cloud infrastructure such that the devices may still utilize cloud services without requiring the cloud infrastructure to still achieve a change in the state of the world. Key benefits of the exemplary embodiments may include compensating for drawbacks associated with a cloud network such as reducing latency, minimizing downtime issues for cloud services being disabled, decreasing security and privacy issues from increased data communications, etc. Detailed implementation of the exemplary embodiments follows.

Conventional approaches in orchestrating devices in a network utilize a variety of approaches with different fundamentals and/or objectives. For example, conventional approaches often utilize resource management as a basis on which to orchestrate operations performed by devices in a network. Accordingly, each decision may incorporate how a single component, a plurality of components, or a system of components utilize available resources to perform operations. In certain conventional approaches, the management of resources may take a significant priority that other considerations may be omitted (e.g., a component that may not be considered due to an unavailability of resources may still be an optimal choice to perform a given operation). In another example, a conventional approach may orchestrate peer devices where the peer devices may represent an enclosed sub-system. When a device in the sub-system transmits a request corresponding to a task, the conventional approach determines how to assign the task to the peer devices in the sub-system. However, this conventional approach does not consider orchestrating tasks or operations when an external device is involved. In a further example, a conventional approach may provide an orchestration system that controls devices within a communicable reach and manage aspects of those devices. However, this conventional approach is centralized where the orchestrator performs a simulation to determine the aspects that are managed. Therefore, the orchestrator in this conventional approach requires as much information from the devices to perform the simulation and make a decision, which is a centralized operation without a holistic learning feature. In yet another example, a conventional approach focuses on a manner and/or frequency with which data is to be provided from devices according to triggering conditions (e.g., an event occurs, more information is required, etc.). Accordingly, this conventional approach is based on how the data from the devices are received for any subsequent operation to be performed.

The exemplary embodiments are configured to provide an orchestration approach that compensates for various issues arising with cloud and/or fog computing. As will be described below and as will become apparent to one skilled in the art, the exemplary embodiments enhance fog computing with an orchestration approach that retrieves and takes immediate action from devices to improve performance in critical real-time scenarios where cloud computing may be too "far away" while preventing maintenance delays that may arise due to cloud connectivity issues and use of a cloud infrastructure where cloud processing for cloud services are performed. The exemplary embodiments may also open a single decentralized point of access in the cloud to each device ecosystem. In this manner, the exemplary embodiments may manage one or more device ecosystems for a state of the world to be manipulated without a need for cloud computing to become involved. Furthermore, the exemplary embodiments are agnostic to the manner in which data is received from the devices to orchestrate operations, selective of the most appropriate one or more devices to perform operations or tasks in a relatively resource management independent manner, and de-centralized with the orchestrator determining a state of the world for the devices through simulations polled from the devices.

The exemplary embodiments are described with particular reference to fog and cloud computing where the fog computing, the cloud computing, and device computing including devices utilizing the fog and/or cloud may be represented in respective network layers. Those skilled in the art will understand that the network layers are not equivalent to other layers that may be utilized in a network environment (e.g., OSI layers). In contrast, as will be described below, the network layers described herein may be indicative of a positional arrangement. The exemplary embodiments may utilize an arrangement in which the fog layer may exist between the device layer and the cloud layer. However, this arrangement is only for illustrative purposes. The exemplary embodiments may be utilized and/or modified to be used in any data exchange environment in which a component providing a service for a recipient may be managed through an orchestrator that communicates with the recipient via a directly connected agent.

FIG. 1 depicts a device orchestration system 100, in accordance with the exemplary embodiments. According to the exemplary embodiments, the device orchestration system 100 may include one or more smart devices 110, one or more agents 120, an orchestrator 130, and cloud services 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. The device orchestration system 100 represents a communication arrangement in which the components thereof are configured to exchange data with one another in a direct or indirect manner.

In the exemplary embodiments, the network 108 may be a communication channel capable of transferring data between connected devices. Accordingly, the components of the device orchestration system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the device orchestration system 100 that do not utilize the network 108.

In the exemplary embodiments, the one or more smart devices 110 may include a device exchange client 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 5, as part of a cloud implementation with reference to FIG. 6, and/or as utilizing functional abstraction layers for processing with reference to FIG. 7.

In the exemplary embodiments, the device exchange client 112 may act as a client in a client-server relationship and may be a software, hardware, and/or firmware based application capable of determining and exchanging data corresponding to a state of a world or a device ecosystem that the smart device 110 is a part via the network 108. In embodiments, the device exchange client 112 may perform operations in a substantially background capacity and in an automated manner as well as interact with one or more components of the device orchestration system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The device exchange client 112 may be configured to determine data corresponding to the state of the world or the device ecosystem including the smart device 110 and further smart devices 110. The device exchange client 112 may receive a request for polling data. As a result of receiving the request, the device exchange client 112 may perform one or more operations that determine the state of the world or the device ecosystem based on the information that is currently available, at least locally, on the smart device 110. For example, changes to sensory data (e.g., from health monitoring equipment), document data (e.g., changes to be reflected on a document stored in the cloud), etc. may be stored locally on the smart device 110 prior to an exchange with the cloud for updating and further cloud operations (e.g., logical aggregation, transformation, etc.). Accordingly, the device exchange client 112 may perform a simulation locally based on the available data to generate the polling data to respond to the request. Those skilled in the art will understand the various techniques and approaches that may be used in performing a simulation based on the available information to generate the polling data. For example, based on the objective and/or purpose of the cloud services, the simulation may utilize a respective set of operations to perform a simulation. The exemplary embodiments may be configured for the smart device 110 to be capable of performing the appropriate set of operations to perform the simulation for the polling data to be generated.

In the exemplary embodiments, the one or more agents 120 may include an agent exchange client 122 and a confidence client 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the agent 120 is shown as a single device, in other embodiments, the agent 120 may be comprised of a cluster or plurality of computing devices, in a modular manner, etc., working together or working independently. The agent 120 is described in greater detail as a hardware implementation with reference to FIG. 5, as part of a cloud implementation with reference to FIG. 6, and/or as utilizing functional abstraction layers for processing with reference to FIG. 7.

As will be described in further detail below, the agents 120 may be a component that is utilized in fog and/or cloud computing to provide certain features such as increased security. The agents 120 may be configured such that a direct connection is established between the agents 120 and select ones of the smart devices 110. It is noted that the "direct" connection does not require that the smart device 110 be connected to the agent 120 with no components existing therebetween (e.g., a wired connection with one end connected to the smart device 110 and the other end connected to the agent). In contrast, one skilled in the art will understand that the direct connection may include various network components for a communication to be exchanged therebetween. However, components such as those used in cloud computing to provide the cloud services 140 may not be part of the communication pathway between the smart device 110 and the agent 120 for the direct connection to be established. The direct connections between the smart devices 110 and the agents 120 may be established based on various factors (e.g., location, service agreement, type of cloud service being provided, etc.).

In the exemplary embodiments, the agent exchange client 122 may act as a client in a client-server relationship as well as act as a server in a client-server relationship with the device exchange client 112 and may be a software, hardware, and/or firmware based application capable of exchanging data corresponding to a state of a world or a device ecosystem that the smart devices 110 are a part via the network 108. In embodiments, the agent exchange client 122 may exchange data for the smart devices 110 that are directly connected thereto, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

Using the direct connection with the smart devices 110 and the respective device exchange clients 112, the agent exchange client 122 may be configured to maintain a direct connection with select ones of the smart devices 110 according to predetermined factors with which the device orchestration system 100 may be configured. The agents 120 may receive an indication or be programmed to request polling data from the directly connected smart devices 110. For example, the agents 120 may receive a request for polling data (e.g., from the orchestrator 130) and the agents 120 may forward the request to the smart devices 110 connected thereto. In another example, the agents 120 may be programmed to request polling data from the smart devices 110 at predefined intervals (e.g., at a given cycle in which the features of the exemplary embodiments are to be performed). Accordingly, the agents 120 may receive polling data from the smart devices 110 and forward the polling data.

The agents 120 may also receive further instruction and forward the instruction to appropriate destinations such as the smart devices 110. As will be described below, the exemplary embodiments may determine a state of the world or a preview of the state of the world based on the polling data from the smart devices 110 and may determine tasks that are to be performed by select ones of the smart devices 110. The agents 120 to which the select smart devices 110 are connected may receive the corresponding instruction such that the select smart devices 110 may then receive the instruction to perform their assigned task.

In the exemplary embodiments, the confidence client 124 may act as a client in a client-server relationship and may be a software, hardware, and/or firmware based application capable of processing the polling data from the smart devices 110 via the network 108. The confidence client 124 may be configured to determine a confidence score for the polling data that is received from the smart device 110. The confidence score may be a measure of an accuracy of the state of the world or the device ecosystem that may be determined from the polling data. That is, the confidence score may represent a computation based on the polling data from each of the smart devices 110 that identifies how confident the agent 120 is that the preview of the state based on the corresponding smart device 110 is a good representation. For example, when the polling data is related to a cloud service to track health conditions of a user utilizing the smart device 110, the simulation from the corresponding smart device 110 may be used to generate polling data with a high likelihood of representing all of the effects to be produced as other data from the other smart devices 110 may not be relevant. Therefore, the confidence client 124 may determine a high confidence score for such polling data (e.g., a score of 0.95 where the confidence scores range from 0 to 1). In another example, when the polling data is related to a cloud service in which a plurality of users utilizing a plurality of different smart devices 110 contribute in maintaining data, the data available on one of the smart devices 110 may only provide a partial picture. Only through consideration of the data from each of the smart devices 110 utilizing the cloud service may an entire picture be determined. In such a scenario, the confidence client 124 may determine a relatively low confidence score for each polling data on an individual determination. For example, the confidence client 124 may determine that the confidence score is a proportion that the smart device 110 associated with a given polling data is a part of the cloud service. In a particular example, the confidence client 124 may determine a confidence score having a value that is an even distribution among the smart devices 110 utilizing a cloud service where a device ecosystem including four smart devices 110 will each have a confidence score of 0.25. However, those skilled in the art will understand that there may be a plurality of other considerations that may affect the confidence score in a device ecosystem involving two or more smart devices 110 (e.g., priority level, contribution level, a measure of how current information is used in generating the polling data, etc.).

The cloud services 140 may represent any cloud service provider and the services that are rendered for users associated with the smart devices 110. Those skilled in the art will understand the various components, devices, connections, etc. that may be involved in providing the cloud services 140. For example, the cloud services 140 may utilize cloud computing where a network of remote servers and other network devices hosted through a network (e.g., Internet) may provide storage, management, processing, etc. of data in contrast to a local server or network maintained by an entity. The exemplary embodiments may be utilized and/or modified to be used with the cloud services 140 may encompass any cloud service that is available to the users of the smart devices 110. In addition to the traditional benefits of utilizing cloud computing (e.g., utilizing an established infrastructure without requiring to maintain a separate server and the like), the cloud services 140 may provide certain features for the smart devices 110 (e.g., security features), an example of which is described in further detail below. The cloud services 140 may also represent the cloud infrastructure where network devices may be present and performing various operations in providing the different cloud services 140. As will be described below, the exemplary embodiments may allow a cloud service such as those included in the cloud services 140 to still be provided for a device ecosystem without the cloud infrastructure.

In the exemplary embodiments, the orchestrator 130 may include a scoring program 132 and a selecting program 134, and act as a server in a client-server relationship with the agent exchange client 122. The orchestrator 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the orchestrator 130 is shown as a single device, in other embodiments, the orchestrator 130 may be comprised of a cluster or plurality of computing devices, working together or working independently. While the orchestrator 130 is also shown as a separate component, in other embodiments, the operations and features of the orchestrator 130 may be incorporated with one or more of the other components of the device orchestration system 100. The orchestrator 130 is described in greater detail as a hardware implementation with reference to FIG. 5, as part of a cloud implementation with reference to FIG. 6, and/or as utilizing functional abstraction layers for processing with reference to FIG. 7.

As described above, the agents 120 may be configured to receive a request for polling data, transmit received polling data from the smart device 110, and receive instructions for select directly connected smart devices. In addition to the operations described below, the orchestrator 130 may also generate corresponding data packages regarding the above noted operations of the agents 120. For example, the orchestrator 130 may be configured transmit a request to the agents 120 for polling data. The orchestrator 130 may determine when to transmit the request such as based on a cycle of when to perform the operations of the exemplary embodiments (e.g., at predetermined time intervals). In another example, the orchestrator 130 may be configured to receive the polling data from the smart devices 110 via corresponding ones of the agents 120 as a result of transmitting the request for polling data or from the agents 120 being programmed to request polling data for a given cycle. In a further example and as will be described in further detail below with regard to the selecting program 134, the orchestrator 130 may also generate the instructions that are received by the agents 120 so that the agents 120 may forward the instructions to the appropriate destination.

In the exemplary embodiments, the soring program 132 may be a software, hardware, and/or firmware application configured to incorporate the confidence score that is received from the agents 120 for the corresponding polling data from the smart devices 110. The scoring program 132 may determine the manner in which each of the polling data corresponding to the smart devices 110 is to be utilized based on the corresponding confidence score. For example, the confidence score may provide a weight in which to utilize a particular one of the polling data.

In the exemplary embodiments, the selecting program 134 may be a software, hardware, and/or firmware application configured to determine a state of a world or device ecosystem in which the smart devices 110 are a part or a preview thereof (referred to collectively or individually as the "state of the world") based on the polling data from the smart devices as well as other complementary information such as the respective confidence scores associated with the polling data and historical data (e.g., information regarding how cloud services have been used, previous actions performed by agents 120 and smart devices 110 to affect the world with a corresponding previous result, prior orchestrations on historical cycles, etc.). The preview state of the world or device ecosystem may indicate an expected state of the world upon one or more actions being actuated by the smart devices 110. In determining the state of the world, the selecting program 134 may determine the tasks, actions, and/or operations that are to be performed by the smart devices to appropriately affect or change the world including the smart devices 110. Accordingly, the tasks may, in essence, allow the cloud service to be provided by the orchestrator 130 without requiring the cloud infrastructure or cloud components from performing corresponding operations. Upon determining the actions that are to be performed and determining which of the smart devices 110 are to perform a corresponding one of the actions, the selecting program 134 may generate an instruction that is transmitted to the agent 120 that is directly connected to the determined smart device 110 such that the agent 120 transmits the instruction to the determined smart device 110 via the direct connection. In this manner, the orchestrator 130 may provide a functionality of a brain of the device orchestration system 100 to decide what to do (e.g., on every cycle that the polling data is received) and which of the agents 120 to trigger for the appropriate smart device 110 to perform an action given historical and/or real time data (e.g., via simulations performed by the smart devices 110 to generate the polling data).

As noted above, the orchestrator 130 may utilize historical information to determine selections for a current cycle. For example, the historical information may include previous orchestrations in respective previous cycles. Accordingly, the orchestrator 130 may be configured with a reinforcement learning model in which previous orchestrations performed by the orchestrator 130 may be utilized to learn and train the model such that subsequent orchestrations by the orchestrator 130 may generate more accurate orchestrations for desired changes to the world to be realized.

The orchestrator 130 may be configured to orchestrate the smart devices 110 that comprise the world or device ecosystem. Accordingly, the smart devices 110 may be entirely within a given ecosystem, may be from external devices (e.g., multiple ecosystems), etc. The orchestrator 130 may thereby determine a selection of which of the smart devices 110 are to take action according to, for example, a request to affect the world, for which an exemplary implementation is described below. The orchestrator 130 may perform the selection from the available set of smart devices 110 by picking at least one of these smart devices 110 to satisfy the request. In determining the selection, the device orchestration system 100 configures the orchestrator 130 with a posterior orchestration framework.

As described above, the orchestrator 130 may be a brain that determines the actions that are to be performed by the smart devices 110 for a change to the world to be achieved. However, the device orchestration system 100 is configured to be intrinsically decentralized. For example, the orchestrator 130 is not configured to simulate the cloud service for which the polling data may be directed. Instead, the orchestrator 130 coordinates the smart devices 110 to perform a simulation and generate corresponding polling data where each of the smart devices 110 that are being polled observe its own environments/world/ecosystem. The smart devices 110 transmit the polling data to the directly connected agents 120 such that the agents 120 transmit the polling data (i.e., the simulation data results) to the orchestrator 130. The orchestrator 130 may also have access to other relevant information such that the polling data becomes an augmented version of the simulation results that is used to perform the selection of the smart devices 110 that will perform at least one action to change the state of the world. Through the decentralized approach, the orchestrator 130 has the benefit of minimizing the amount of information that is stored about the smart devices 110 by relying on the polling data to select which of the smart devices 110 are to perform an action.

As described above, the exemplary embodiments may be directed toward a cloud computing environment including a cloud layer and a device layer where the smart devices 110 may exist. The exemplary embodiments may also be directed toward a fog computing environment including a fog layer between the cloud layer and the device layer. The fog being between the cloud layer and the device layer may be indicative of a communicative disposition. In addition, the exemplary embodiments may utilize a cloud and/or fog that utilizes the agent 130 (e.g., in contrast to an agentless system). Therefore, the exemplary embodiments may utilize the features of the fog and the agent 130. For example, the fog may provide an extension to the cloud through edge nodes (e.g., the agent 130) that directly connect to the smart devices 110 where the edge nodes are physically closer to the smart devices 110. In another example, the fog may alleviate issues that may arise with the cloud, particularly when the cloud (e.g., the infrastructure that provides the cloud service) is distant or too far away. In this manner, the fog may provide a lower latency than with utilizing the cloud, eliminate bandwidth issues, etc. as well as device benefits including higher security, improved power efficiency, etc. while providing an improved user experience. In a further example, the agent 130 may collect relevant information, transmit the information to a central control system (e.g., a cloud infrastructure), and provide a capability to control security (e.g., at a virtual machine level). The exemplary embodiments may also entail the agent 130 performing further operations such as the forwarding of the request from the orchestrator 130 for polling data from the smart devices 110 and forwarding instructions from the orchestrator 130 to the smart devices 110 that are directly connected thereto.

The exemplary embodiments may utilize the features of cloud computing as well as fog computing where the agents 120 may exist in the fog layer while the orchestrator 130 may exist in the cloud layer or the fog layer. The positioning of the orchestrator 130 in performing the above described operations may allow for the features of the orchestrator 130 to be applied to various scenarios.

Figure 2:
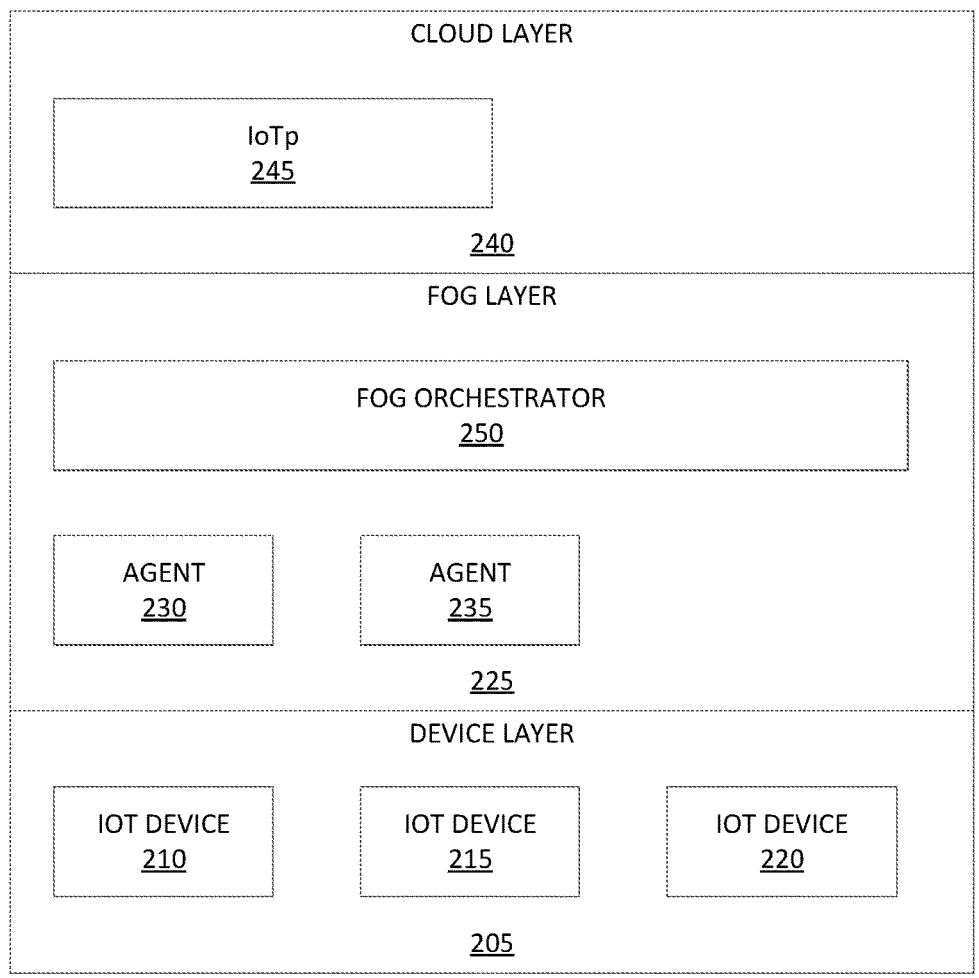
FIG. 2 depicts an exemplary arrangement 200 including an orchestrator 130 of the device orchestration system 100 positioned in a fog, in accordance with the exemplary embodiments.

FIG. 2 depicts an exemplary arrangement 200 including the orchestrator 130 of the device orchestration system 100 positioned in a fog, in accordance with the exemplary embodiments. As described above and as illustrated in the arrangement 200 of FIG. 2, the device orchestration system 100 may include a device layer 205, a fog layer 225, and a cloud layer 240. The device layer 205 may include IoT devices 210, 215, 220 which correspond to the smart devices 110 of FIG. 1. The cloud layer 240 may include the cloud services 140 of FIG. 1. As noted above, the cloud may include various features. For example, the cloud layer 240 may include an IoT privacy (IoTp) 245 feature in which privacy aspects in utilizing the cloud services 140 may be preserved. In the arrangement 200, the fog layer 225 may include agents 230, 235 which correspond to the agents 120 of FIG. 1 as well as a fog orchestrator 250 which corresponds to the orchestrator 130 of FIG. 1.

The arrangement 200 may include a plurality of connections between the components. For example and as described above, the agents 230, 235 may be directly connected to the IoT devices 210, 215, 220. In an exemplary implementation, the agent 230 may be directly connected to the IoT device 210 while the agent 235 may be directly connected to the IoT devices 215, 220 based on a proximity factor. In another example, the IoT devices 210, 215, 220 may be connected to the IoTp 245 through a respective physical interface of the IoTp 245. In yet another example, the fog orchestrator 250 may be connected to the agents 230, 235. In a further example, the fog orchestrator 250 may be connected to the cloud services 140 of the cloud layer 240. In an exemplary implementation, the orchestrator 250 may include an application programming interface (API) (not shown) that is configured to establish the connection to the cloud services 140. In this manner, the orchestrator 250 may have information regarding the cloud services 140 that are being utilized by the IoT devices 210-220 and have knowledge with regard to logical aggregations, transformations that are to be applied, etc. for a state of the world to be affected. The API of the orchestrator 250 may also be configured to establish a connection to further features such as a web-based computer maintenance management system (CMMS), a system that is configured to support various device types and vendors, etc.

Through the layers 205, 225, 240 and the various connections, the device orchestration system 100 positioning the fog orchestrator 250 in the fog layer 225 may allow the fog orchestrator 250 to provide the features of the exemplary embodiments to various scenarios. For example, the IoT devices 210-220 may share a common network in the fog but are functionally unrelated to each other. Accordingly, an action or data in one of the IoT devices 210-220 may not produce an effect on any of the other IoT devices 210-220. In this scenario, the combination of data from different IoT devices 210-220 may only be interpreted in the cloud where users may define the logical aggregations and apply the appropriate transformations. As a result, intelligence and automatic task triggering in the fog may be missed. However, the exemplary embodiments may allow the fog to work isolated from the cloud to perform autonomous processes. For example, the autonomous processes may include device health, maintenance, device interaction, etc. The orchestrator 250 that is deployed in the fog layer 225 may process sensed data from the IoT devices 210-220 (e.g., provided as polling data) and trigger the best actions for a specific condition to affect the state of the world including the IoT devices 210-220.

Figure 3:
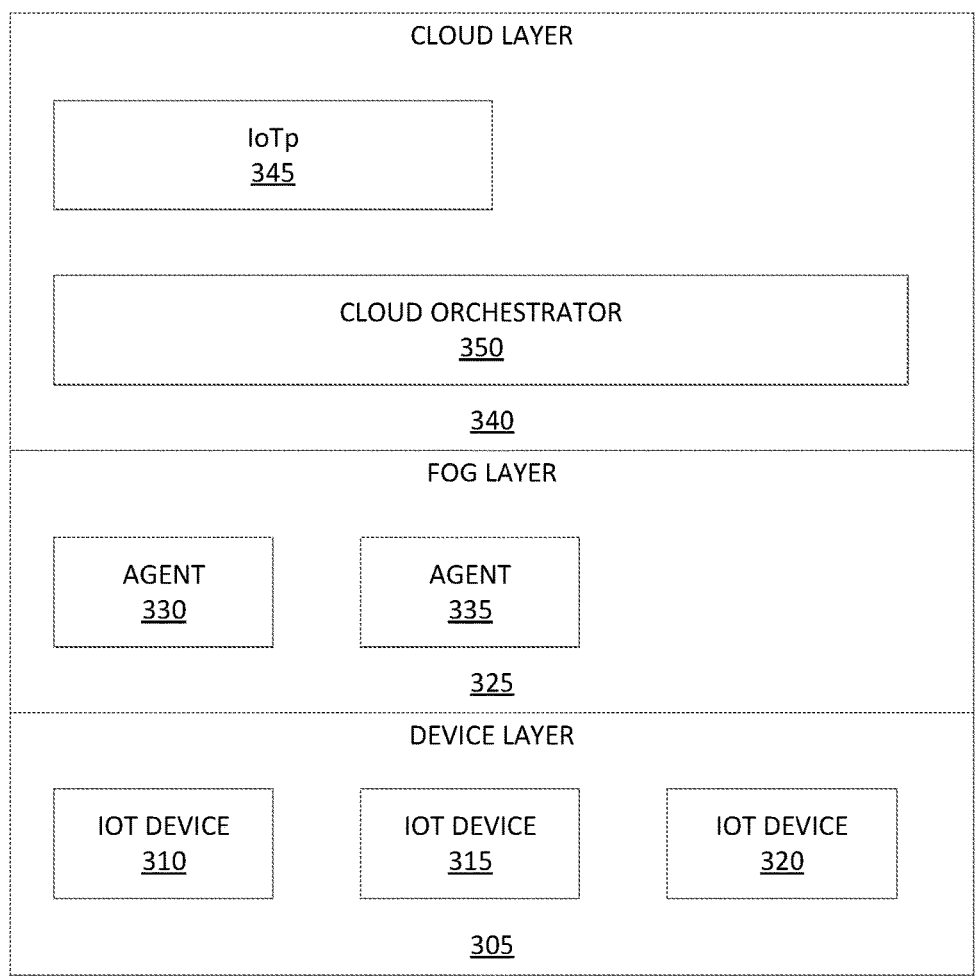
FIG. 3 depicts an exemplary arrangement 300 including the orchestrator 130 of the device orchestration system 100 positioned in a cloud, in accordance with the exemplary embodiments.

FIG. 3 depicts an exemplary arrangement 300 including the orchestrator 130 of the device orchestration system 100 positioned in a cloud, in accordance with the exemplary embodiments. The arrangement 300 may be substantially similar to the arrangement 200. For example, the arrangement 300 may also include a device layer 305, a fog layer 325, and a cloud layer 340. The device layer 305 may include IoT devices 310, 315, 320 which correspond to the smart devices 110 of FIG. 1. The cloud layer 340 may include the cloud services 140 of FIG. 1 as well as an IoTp 345 feature. In the arrangement 300, the fog layer 325 may include agents 330, 335 which correspond to the agents 120 of FIG. 1. In contrast to the arrangement 200, in the arrangement 300, the cloud layer 340 may include a cloud orchestrator 350 which corresponds to the orchestrator 130 of FIG. 1. The arrangement 300 may include a plurality of connections in a manner substantially similar to the arrangement 200 with modified connections involving the cloud orchestrator 350 that resides in the cloud layer 340.

Through the layers 305, 325, 340 and the various connections, the device orchestration system 100 positioning the cloud orchestrator 350 in the cloud layer 340 may allow the cloud orchestrator 350 to provide the features of the exemplary embodiments to various other scenarios. For example, a user utilizing one of the IoT devices 310-320 may want to access IoT device information. The users and/or the IoT devices 310-320 may have access to the IoT device information using the cloud services 140. However, pushing the information towards fog computing from the IoT devices 310-320 may not be readily available. In contrast, the exemplary embodiments may allow the information to be available on the IoT devices 310-320. The orchestrator 350 in the cloud may obtain the information for the users and/or the IoT devices 310-320 from the fog via the agents 330, 335 that are directly connected to the IoT devices 310-320. Once the orchestrator 250 receives a request from the user and/or one of the IoT device 310-320 for the information, the orchestrator 350 may request a preview from the agents 330, 335 by polling the IoT devices 310-320 and receiving corresponding polling data. The orchestrator 350 may subsequently proceed to determine the response that has the most relevant information for the request.

Figure 4:
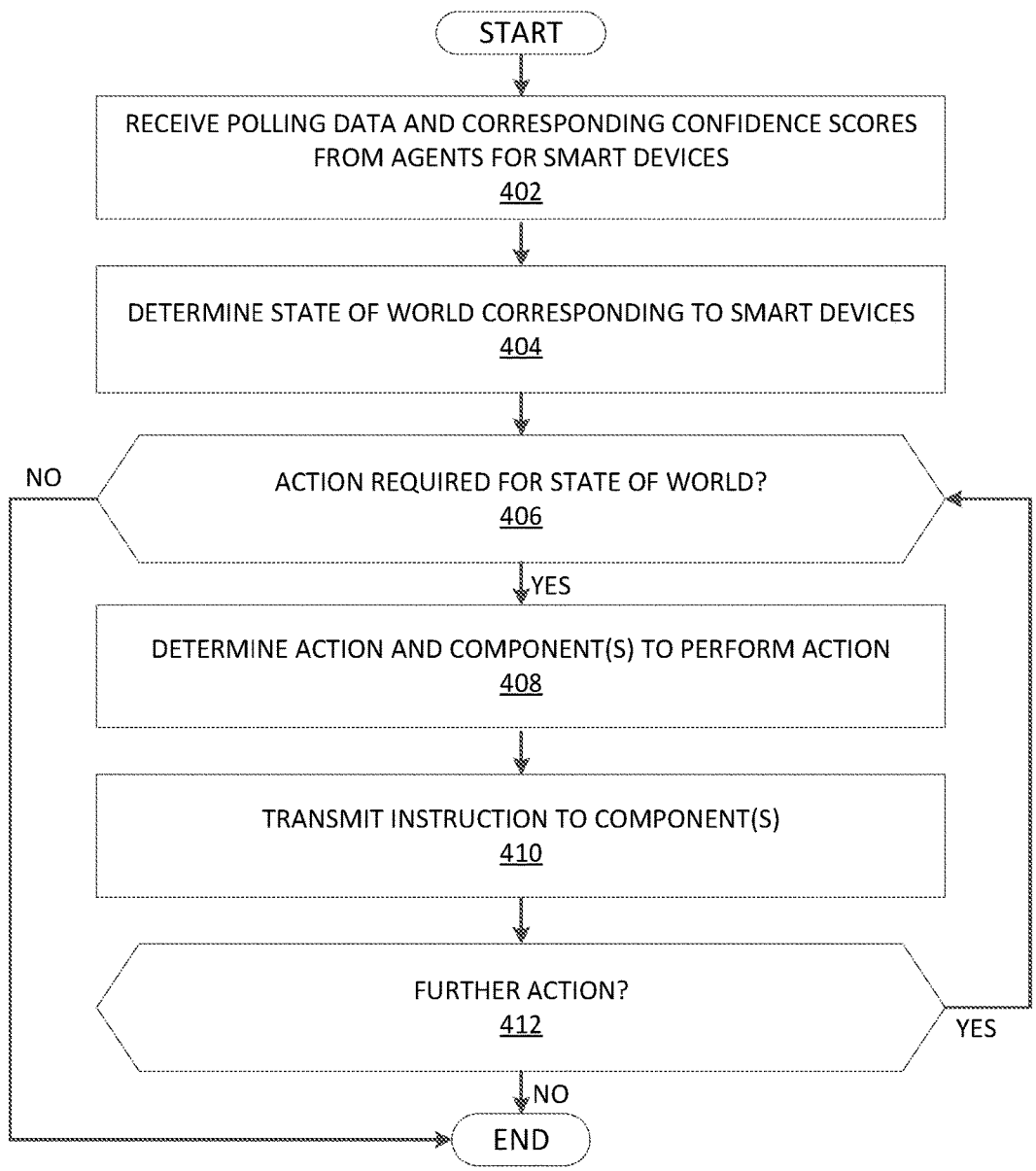
FIG. 4 depicts an exemplary flowchart of a method 400 illustrating the operations of the orchestrator 130 of the device orchestration system 100 in orchestrating devices using data polled from the devices through directly connected agents, in accordance with the exemplary embodiments.

FIG. 4 depicts an exemplary flowchart of a method 400 illustrating the operations of the orchestrator 130 of the device orchestration system 100 in orchestrating the smart devices 110 using data polled from the smart devices 110 through agents 120 that are directly connected thereto, in accordance with the exemplary embodiments. The method 400 may relate to operations that are performed by the scoring program 132 and the selecting program 134 of the orchestrator 130. Accordingly, the method 400 will be described from the perspective of the orchestrator 130.

The orchestrator 130 may receive polling data and corresponding confidence scores from the agents 120 that are directly connected to the smart devices 110 (step 402). When a cycle is to be run, the orchestrator 130 may generate a request that is transmitted to the agents 120 so that the polling data may be received. The agents 120 may forward the request to the smart devices 110 such that each of the smart devices 110 may run a simulation (e.g., based on the cloud service) utilizing available information relative to the smart devices 110. In this manner, the smart devices 110 may observe its own environment (e.g., the world, the device ecosystem, etc.). In running the simulation, the smart devices 110 may generate polling data. According to an exemplary implementation, the smart devices 110 may provide the polling data in a raw format. The agent 130 may analyze the raw polling data and generate developed polling data which is then provided to the orchestrator 130 in response to the request. The agent 130 may also receive the polling data and determine a confidence score for each polling data from a respective one of the smart devices 110.

As a result of receiving the polling data, the orchestrator 130 may determine a state of the world including the smart devices 110 (step 404). In an exemplary implementation, the orchestrator 130 may determine a preview of the state of the world by incorporating the sensed information included in the polling data. With simulations being run on the smart devices 110, the orchestrator 130 may process the polling data to determine any action that is to be performed by any of the smart devices 110 so that an appropriate change to the state of the world may be actuated.

In determining the state of the world, the orchestrator 130 may incorporate the confidence score of the polling data. In an exemplary implementation, the confidence scores may be directed toward a selected scenario for which the polling data for the given scenario is scored. For each polling data from the smart devices 110, relevant information may be extracted from the polling data for the confidence score associated therewith to be determined for the given scenario. In incorporating the confidence scores that are associated with the polling data, the orchestrator 130 may subsequently determine actions that are to be performed for the given scenario as well as the components (e.g., select ones of the smart devices 110) that are to perform the actions. For example, the orchestrator 130 may filter each of the scored polling data to determine the actions and components to perform the actions. In this manner, the orchestrator 130 may determine one or more actions that are to be performed by one or more of the smart devices 110 where one action may involve one or more of the smart devices 110 or one of the smart devices 110 may be responsible for one or more of the actions. As noted above, the orchestrator 130 may utilize reinforcement learning models in which historical information of previous cycles may provide insight in determining the actions and selecting the components.

As a result of processing of the polled data, the orchestrator 130 may determine whether an action is required to change the state of the world in an appropriate manner (decision 406). As a result of no action being required (decision 406, "NO" branch), the orchestrator 130 may conclude the current cycle and update any models through learning from the currently concluded cycle so that subsequent cycles may utilize any available historical information.

As a result of at least one action being required (decision 406, "YES" branch), the orchestrator 130 may determine the action and the one or more components that are to perform the action (step 408). The orchestrator 130 may transmit an instruction indicative of the action and the components to the corresponding agent 120 (step 410). Accordingly, for the selected action, the orchestrator 130 may transmit the instruction to the agent 120 which then actuates the change by instructing the smart device 110 to perform the action. In an exemplary implementation, the orchestrator 130 may be configured to generate a single instruction including the actions to be performed and the one or more components that are to perform the actions to actuate the change. The agents 120 may process the instruction and determine if and how to actuate the change (e.g., determine whether any of the directly connected smart devices 110 are to receive the instruction). In actuating the change, the smart device 110 may provide result data such as through running another simulation and providing updated polling data so that the actual change to the state of the world may be known.

The orchestrator 130 may continue this process by determining whether there is at least one further action (decision 412). As a result of there being at least one more action to process (decision 412, "YES" branch), the orchestrator 130 provides the appropriate instruction to the agent 120 which then actuates the change on the smart device 110 through an action to be performed. As a result of no further action to process (decision 412, "NO" branch), the orchestrator 130 may conclude the current cycle and update any models through learning from the currently concluded cycle so that subsequent cycles may utilize any available historical information.

The exemplary embodiments are configured to orchestrate a plurality of devices that utilize cloud services. The exemplary embodiments provide an orchestrator that requests polling data from the devices where the polling data is indicative of results of a simulation performed by the devices in observing the world or device ecosystem. The orchestrator of the exemplary embodiments may process the polling data and utilize other relevant information to determine one or more actions that are to be performed by one or more of the devices. The orchestrator may generate an instruction to be transmitted to the agents that actuate a change to the world or device ecosystem by instructing the devices to perform the actions.

Figure 5:
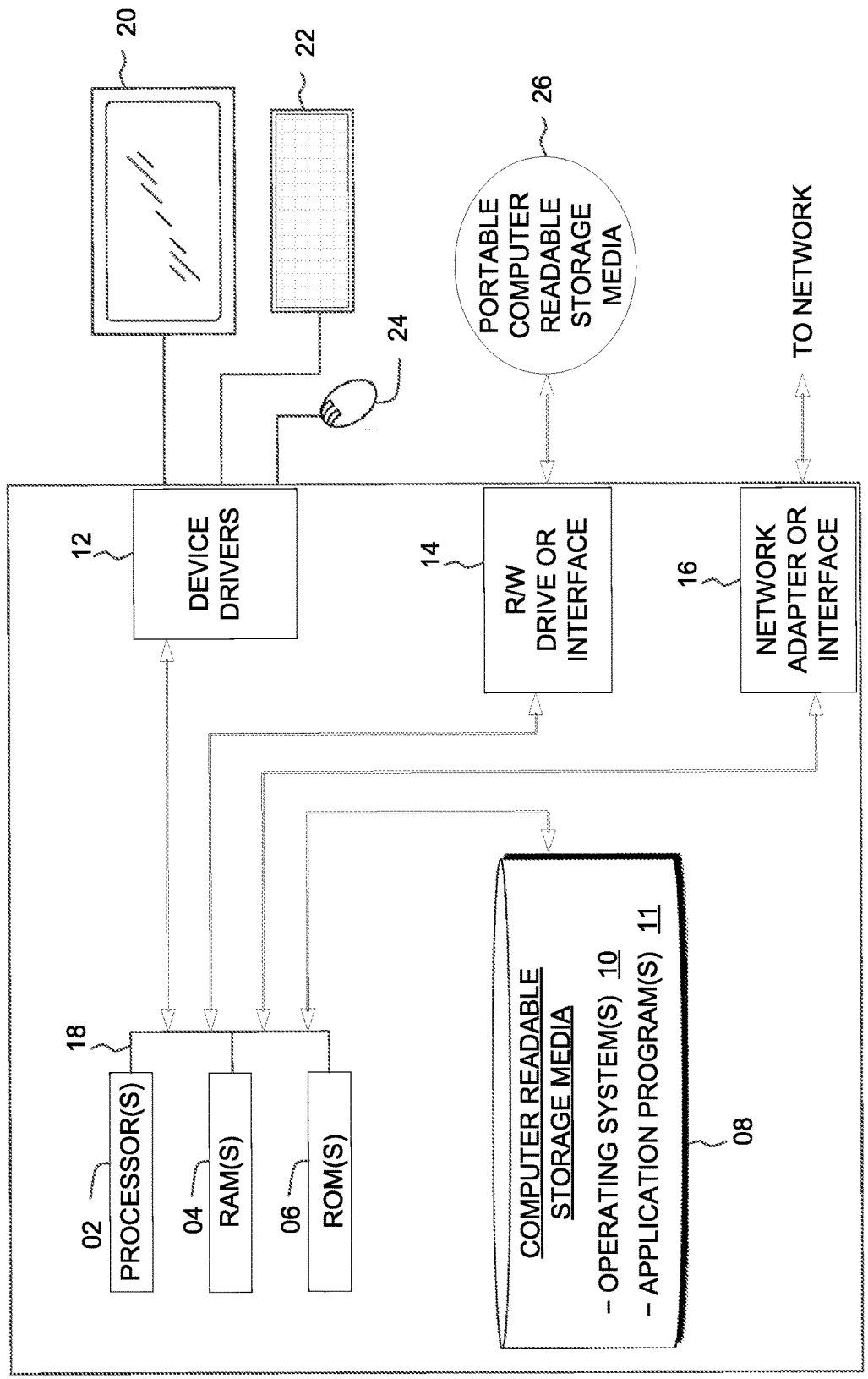
FIG. 5 depicts an exemplary block diagram depicting the hardware components of the device orchestration system 100 of FIG. 1, in accordance with the exemplary embodiments.

FIG. 5 depicts a block diagram of devices within the device orchestration system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
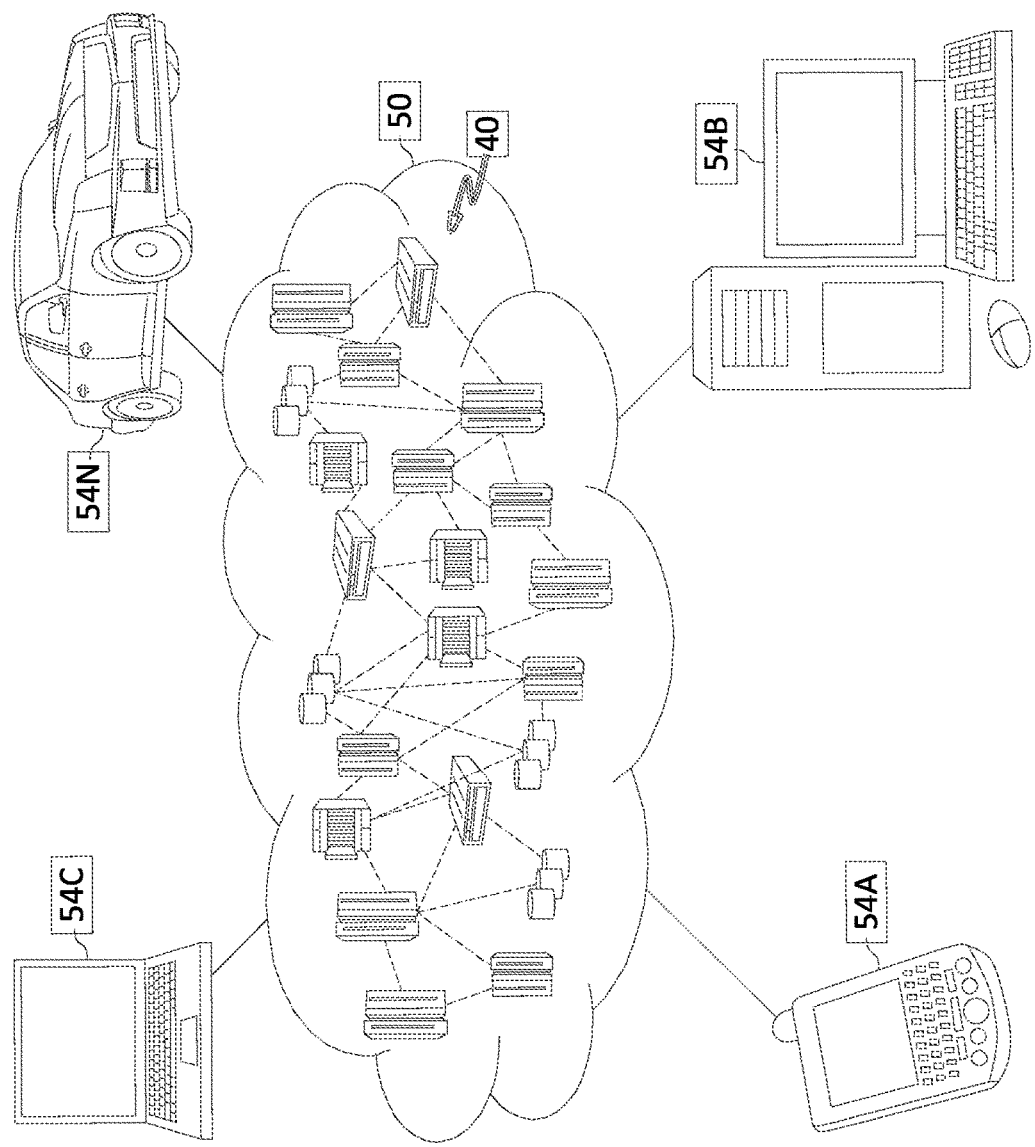
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
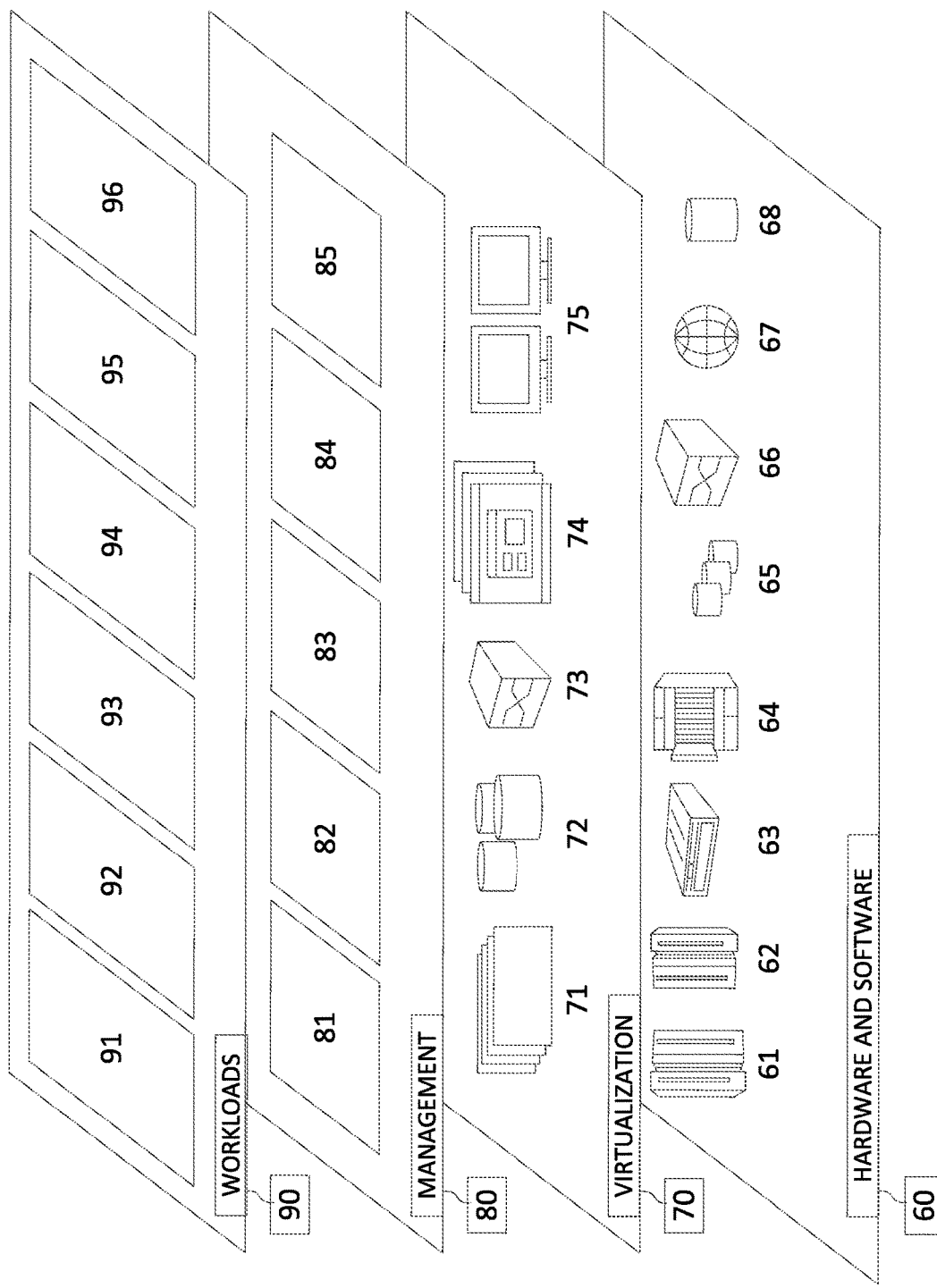
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device orchestration processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for orchestrating devices of a device ecosystem, the method comprising:
   receiving, by an orchestrator, polling data from agents, each of the agents being directly connected to one or more of the devices, the polling data being indicative of a respective simulation run by each of the devices observing the device ecosystem for a cloud service utilized by the devices;
   determining, by the orchestrator, a preview state of the device ecosystem based on the polling data;
   determining, by the orchestrator, an action to be performed by at least one of the devices to actuate a change to a state of the device ecosystem based on the preview state of the device ecosystem;
   generating, by the orchestrator, an instruction indicative of the action and the at least one of the devices to perform the action; and
   transmitting, by the orchestrator, the instruction to the agents, the agents actuating the change via the determined at least one of the devices performing the action,
   wherein the orchestrator orchestrates the agents such that the devices are provided the cloud service isolated from a cloud computing system associated with the cloud service.

2. The computer-implemented method of claim 1, further comprising:
   for each polling data from corresponding ones of the devices, receiving a confidence score indicative of a relevance of the polling data to the cloud service,
   wherein determining the preview state of the device ecosystem is further based on the confidence scores,
   wherein determining the action to be performed by the at least one of the devices is further based on the confidence scores.

3. The computer-implemented method of claim 1, wherein the agents are deployed in a fog communicatively disposed between the devices and the cloud computing system.

4. The computer-implemented method of claim 3, wherein the orchestrator is deployed in one of the fog and the cloud computing system.

5. The computer-implemented method of claim 4, wherein, with the orchestrator being deployed in the fog, the devices share a common network in the fog and are functionally unrelated to each other.

6. The computer-implemented method of claim 4, wherein, with the orchestrator being deployed in the cloud computing system, generating the instruction is a result of receiving an information request associated with the cloud service from one of the devices.

7. The computer-implemented method of claim 1, wherein the determining the action to be performed by the at least one of the devices is based at least in part on a reinforcement learning model trained on prior orchestrations performed by the orchestrator.

8. A computer program product for orchestrating devices of a device ecosystem, the computer program product comprising:
one or more non-transitory computer-readable storage media and program instructions stored on the one or more non-transitory computer-readable storage media capable of performing a method, the method comprising:
receiving, by an orchestrator, polling data from agents, each of the agents being directly connected to one or more of the devices, the polling data being indicative of a respective simulation run by each of the devices observing the device ecosystem for a cloud service utilized by the devices;
determining, by the orchestrator, a preview state of the device ecosystem based on the polling data;
determining, by the orchestrator, an action to be performed by at least one of the devices to actuate a change to a state of the device ecosystem based on the preview state of the device ecosystem;
generating, by the orchestrator, an instruction indicative of the action and the at least one of the devices to perform the action; and
transmitting, by the orchestrator, the instruction to the agents, the agents actuating the change via the determined at least one of the devices performing the action,
wherein the orchestrator orchestrates the agents such that the devices are provided the cloud service isolated from a cloud computing system associated with the cloud service.

9. The computer program product of claim 8, wherein the method further comprises:
for each polling data from corresponding ones of the devices, receiving a confidence score indicative of a relevance of the polling data to the cloud service,
wherein determining the preview state of the device ecosystem is further based on the confidence scores,
wherein determining the action to be performed by the at least one of the devices is further based on the confidence scores.

10. The computer program product of claim 8, wherein the agents are deployed in a fog communicatively disposed between the devices and the cloud computing system.

11. The computer program product of claim 10, wherein the orchestrator is deployed in one of the fog and the cloud computing system.

12. The computer program product of claim 11, wherein, with the orchestrator being deployed in the fog, the devices share a common network in the fog and are functionally unrelated to each other.

13. The computer program product of claim 11, wherein, with the orchestrator being deployed in the cloud computing system, generating the instruction is a result of receiving an information request associated with the cloud service from one of the devices.

14. The computer program product of claim 8, wherein the determining the action to be performed by the at least one of the devices is based at least in part on a reinforcement learning model trained on prior orchestrations performed by the orchestrator.

15. A computer system for orchestrating devices of a device ecosystem, the computer system comprising:
one or more computer processors, one or more computer-readable storage media, and program instructions stored on the one or more of the computer-readable storage media for execution by at least one of the one or more processors capable of performing a method, the method comprising:
receiving, by an orchestrator, polling data from agents, each of the agents being directly connected to one or more of the devices, the polling data being indicative of a respective simulation run by each of the devices observing the device ecosystem for a cloud service utilized by the devices;
determining, by the orchestrator, a preview state of the device ecosystem based on the polling data;
determining, by the orchestrator, an action to be performed by at least one of the devices to actuate a change to a state of the device ecosystem based on the preview state of the device ecosystem;
generating, by the orchestrator, an instruction indicative of the action and the at least one of the devices to perform the action; and
transmitting, by the orchestrator, the instruction to the agents, the agents actuating the change via the determined at least one of the devices performing the action,
wherein the orchestrator orchestrates the agents such that the devices are provided the cloud service isolated from a cloud computing system associated with the cloud service.

16. The computer system of claim 15, wherein the method further comprises:
for each polling data from corresponding ones of the devices, receiving a confidence score indicative of a relevance of the polling data to the cloud service,
wherein determining the preview state of the device ecosystem is further based on the confidence scores,
wherein determining the action to be performed by the at least one of the devices is further based on the confidence scores.

17. The computer system of claim 15, wherein the agents are deployed in a fog communicatively disposed between the devices and the cloud computing system.

18. The computer system of claim 17, wherein the orchestrator is deployed in one of the fog and the cloud computing system.

19. The computer system of claim 18, wherein, with the orchestrator being deployed in the fog, the devices share a common network in the fog and are functionally unrelated to each other.

20. The computer system of claim 18, wherein, with the orchestrator being deployed in the cloud computing system, generating the instruction is a result of receiving an information request associated with the cloud service from one of the devices.

\* \* \* \* \*